(12) United States Patent
Shi et al.

(10) Patent No.: US 11,172,394 B2
(45) Date of Patent: Nov. 9, 2021

(54) METHOD FOR CHANNEL STATE INFORMATION CSI MEASUREMENT, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 55 days.

(21) Appl. No.: 16/739,804

(22) Filed: Jan. 10, 2020

(65) Prior Publication Data
US 2020/0154299 A1     May 14, 2020

Related U.S. Application Data

(63) Continuation of application No. PCT/CN2018/073521, filed on Jan. 19, 2018.

(51) Int. Cl.
*H04W 24/10*     (2009.01)
*H04B 7/024*     (2017.01)
(Continued)

(52) U.S. Cl.
CPC ............ *H04W 24/10* (2013.01); *H04B 7/024* (2013.01); *H04B 7/0626* (2013.01); *H04L 5/0051* (2013.01)

(58) Field of Classification Search
CPC ............... H04W 24/10; H04W 36/305; H04W 72/0406; H04B 7/024; H04B 7/0626;
(Continued)

(56) References Cited

U.S. PATENT DOCUMENTS

2018/0034612 A1*   2/2018   Lin ..................... H04B 17/345
2018/0331860 A1*   11/2018   Bergman .............. H04L 5/0048
(Continued)

FOREIGN PATENT DOCUMENTS

CN     103973399 A     8/2014
CN     104205660 A     12/2014
(Continued)

OTHER PUBLICATIONS

International Search Report (ISR) with an English translation dated Aug. 8, 2018 for Application No. PCT/CN2018/073521.
(Continued)

*Primary Examiner* — Huy D Vu
*Assistant Examiner* — Robert Ma
(74) *Attorney, Agent, or Firm* — Ladas & Parry LLP (57) ABSTRACT

Embodiments of the present disclosure provide a method for channel state information CSI measurement, a terminal device and a network device. The method includes: a terminal device assumes that a first channel state information-reference signal (CSI-RS) and a second CSI-RS have a quasi co-location QCL association with respect to a spatial receiving parameter, where the first CSI-RS and the second CSI-RS are respectively a reference signal for channel measurement and a reference signal for interference measurement in a CSI measurement; and the terminal device performs the CSI measurement according to QCL information between the first CSI-RS and the second CSI-RS. The method, terminal device and network device according to the embodiments of the present disclosure are advantageous for improving receiving performance of a UE.

10 Claims, 4 Drawing Sheets

(51) Int. Cl.
*H04B 7/06* (2006.01)
*H04L 5/00* (2006.01)

(58) Field of Classification Search
CPC ... H04B 17/345; H04B 7/0639; H04L 5/0051; H04L 25/0224; H04L 5/0057; H04L 5/0048
See application file for complete search history.

(56) References Cited

U.S. PATENT DOCUMENTS

| | | | |
|---|---|---|---|
| 2019/0013854 A1* | 1/2019 | Kim | H04W 72/0406 |
| 2020/0221427 A1* | 7/2020 | Nilsson | H04W 36/305 |
| 2020/0228267 A1* | 7/2020 | Park | H04B 7/0639 |

FOREIGN PATENT DOCUMENTS

| | | |
|---|---|---|
| CN | 105025519 A | 11/2015 |
| CN | 105101307 A | 11/2015 |
| EP | 2933942 A1 | 10/2015 |
| WO | 2014129716 A1 | 8/2014 |

OTHER PUBLICATIONS

The EESR of corresponding European application No. 18901612.4, dated Jun. 18, 2020.
VIVO:"Remaining issues and text proposals on CSI measurement", 30PP Draft; R1-1806183 Remaining Issues and Text Proposals on CSI Measurement, 3rd Generation Partnership Project (GPP), Mobile Competence Centre; 650, Route Des Luicioles; F-06921 Sopha-Antipolis, vol. RAN WG1, No. Vancouver, Canada; Dec. 22, 201-Jan. 26, 2018 Jan. 13, 2018(Jan. 13, 2018), XP051384673.
Nokia et al.:"On QCL Framewark and Configurations in NR", 3GPP Draft; R1-1714261, 3rd Generation Partnership Project (3GPP), Mobile Competence Centre; 660, Route Des Lucioles; F-06921 Sophla-Antipolis Cedex; France, vol. RAN WG1, No. Prague, Czech Republic: Aug. 21, 2017-Aug. 25, 2017 Aug. 20, 2017(Aug. 20, 2017), XP051317047.
The first Office Action of corresponding Chinese application No. 201880039307.9, dated Jun. 22, 2021.

* cited by examiner

METHOD FOR CHANNEL STATE INFORMATION CSI MEASUREMENT, TERMINAL DEVICE AND NETWORK DEVICE

CROSS-REFERENCE TO RELATED APPLICATIONS

This application is a continuation of the International Application No. PCT/CN2018/073521, filed on Jan. 19, 2018, entitled "METHOD FOR CHANNEL STATE INFORMATION CSI MEASUREMENT, TERMINAL DEVICE AND NETWORK DEVICE", the content of which is incorporated herein by reference in its entirety.

TECHNICAL FIELD

Embodiments of the present disclosure relate to the field of communications, and more specifically, to a method for channel state information (CSI) measurement, a terminal device, and a network device.

BACKGROUND

In a channel state information (CSI) measurement, a UE needs to perform a certain quasi co-location (QCL) assumption, where a channel state information-reference signal (CSI-RS) for channel measurement and a CSI-RS for interference measurement should be quasi co-located with respect to a spatial parameter, for example, they could be spatially quasi co-located, or quasi-co-located with respect to a spatial receiving parameter. There is a need to study how a UE uses a QCL assumption for CSI measurement.

SUMMARY

In view of the above, the embodiments of the present disclosure provide a method for channel state information (CSI) measurement, a terminal device and a network device, to facilitate improving receiving performance of a terminal device.

In a first aspect, a method for channel state information (CSI) measurement is provided, the method including: assuming, by a terminal device, that a first channel state information-reference signal (CSI-RS) and a second CSI-RS have a quasi co-location association (QCL) with respect to a spatial receiving parameter, where the first CSI-RS and the second CSI-RS are respectively a reference signal for channel measurement and a reference signal for interference measurement in a CSI measurement; and performing, by the terminal device, the CSI measurement according to QCL information between the first CSI-RS and the second CSI-RS.

In a possible implementation, a network device does not configure a first type of QCL assumption between the first CSI-RS and the second CSI-RS, and a parameter corresponding to the first type of QCL assumption is a spatial receiving parameter.

In an implementation, the terminal device may directly perform the CSI measurement according to the first type of QCL assumption made by itself.

In a possible implementation, the network device does not configure a second type of QCL assumption between the first CSI-RS and the second CSI-RS, and a parameter corresponding to the second type of QCL assumption includes at least one of the following parameters: Doppler shift, Doppler spread, average delay, and delay spread.

In a possible implementation, the method further includes: receiving, by the terminal device, first configuration information transmitted by a network device, where the first configuration information is used to indicate a second type of QCL assumption configured by the network device between the first CSI-RS and the second CSI-RS, and a parameter corresponding to the second type of QCL assumption includes at least one of the following parameters: Doppler shift, Doppler spread, average delay, and delay spread; and the performing, by the terminal device, the CSI measurement according to QCL information between the first CSI-RS and the second CSI-RS, includes: performing, by the terminal device, the CSI measurement according to the parameter corresponding to the second type of QCL assumption that is indicated by the first configuration information, and the spatial receiving parameter between the first CSI-RS and the second CSI-RS that have a QCL association assumed by the terminal device.

In a possible implementation, the method further includes: receiving, by the terminal device, second configuration information transmitted by a network device, where the second configuration information is used to indicate a first type of QCL assumption configured by the network device for the second CSI-RS, and a parameter corresponding to the first type of QCL assumption is a spatial receiving parameter; and the performing, by the terminal device, the CSI measurement according to QCL information between the first CSI-RS and the second CSI-RS, includes: performing, by the terminal device, the CSI measurement according to the parameter corresponding to the first type of QCL assumption that is indicated by the second configuration information if the first type of QCL assumption indicated by the second configuration information is a first type of QCL assumption between the first CSI-RS and the second CSI-RS.

In a possible implementation, the method further includes: determining, by the terminal device, that the second configuration information is configuration information that is not expected to receive, if the first type of QCL assumption indicated by the second configuration information is not the first type of QCL assumption between the first CSI-RS and the second CSI-RS.

In a possible implementation, the performing, by the terminal device, the CSI measurement according to QCL information between the first CSI-RS and the second CSI-RS, includes: performing, by the terminal device, the CSI measurement according to the spatial receiving parameter between the first CSI-RS and the second CSI-RS that have a QCL association assumed by the terminal device.

In a possible implementation, the second configuration information is further used to indicate a second type of QCL assumption configured between the first CSI-RS and the second CSI-RS, and a parameter corresponding to the second type of QCL assumption further includes at least one of the following parameters: Doppler shift, Doppler spread, average delay, and delay spread; and the performing, by the terminal device, the CSI measurement according to QCL information between the first CSI-RS and the second CSI-RS, includes: performing, by the terminal device, the CSI measurement according to the spatial receiving parameter between the first CSI-RS and the second CSI-RS that have a QCL association, and the parameter corresponding to the second type of QCL assumption that is indicated by the second configuration information.

In a possible implementation, the first CSI-RS is a non-zero power CSI-RS for channel measurement, and the second CSI-RS is a non-zero power CSI-RS for interference measurement.

In a second aspect, a method for channel state information (CSI) measurement is provided, the method including: transmitting, by a network device, configuration information to a terminal device, where the configuration information is used to indicate a QCL association relationship of a first channel state information-reference signal (CSI-RS) or of a second CSI-RS, where the QCL association relationship includes a first type of QCL assumption and/or a second type of QCL assumption, a parameter corresponding to the first type of QCL assumption is a spatial receiving parameter, and a parameter corresponding to the second type of QCL assumption includes at least one of the following parameters: Doppler shift, Doppler spread, average delay, and delay spread, and the first CSI-RS and the second CSI-RS are respectively a reference signal for channel measurement and a reference signal for interference measurement in a CSI measurement.

In a possible implementation, the QCL association relationship is a QCL assumption between the first CSI-RS and the second CSI-RS.

In a possible implementation, the first CSI-RS is a non-zero power CSI-RS for channel measurement, and the second CSI-RS is a non-zero power CSI-RS for interference measurement.

In a third aspect, a terminal device is provided for performing the method according to the first aspect or any of the possible implementations of the first aspect mentioned above. Specifically, the terminal device includes units for performing the method according to the first aspect or any of the possible implementations of the first aspect mentioned above.

In a fourth aspect, a network device is provided for performing the method according to the second aspect or any of the possible implementations of the second aspect mentioned above. Specifically, the network device includes units for performing the method according to the second aspect or any of the possible implementations of the second aspect mentioned above.

In a fifth aspect, a terminal device is provided. The terminal device includes a memory, a processor, an input interface, and an output interface, where the memory, the processor, the input interface, and the output interface are connected via a bus system; the memory is configured to store instructions, and the processor is configured to execute the instructions stored in the memory to implement the method according to the first aspect or any of the possible implementations of the first aspect mentioned above.

In a sixth aspect, a network device is provided. The network device includes a memory, a processor, an input interface, and an output interface, where the memory, the processor, the input interface, and the output interface are connected via a bus system; the memory is configured to store instructions, and the processor is configured to execute the instructions stored in the memory to implement the method according to the second aspect or any of the possible implementations of the second aspect mentioned above.

In a seventh aspect, a computer storage medium is provided, where the computer storage medium is configured to store computer software instructions used for implementing the method according to the first aspect or any of the possible implementations of the first aspect mentioned above, or the method according to the second aspect or any of the possible implementations of the second aspect mentioned above, which includes a program designed for implementing various aspects mentioned above.

In an eighth aspect, a computer program product is provided, which, when being executed on a computer, causes the computer to perform the method according to the first aspect or any of the possible implementations of the first aspect mentioned above, or the method according to the second aspect or any of the possible implementations of the second aspect mentioned above.

In the present disclosure, names of the terminal device and the network device do not constitute a limitation on the devices themselves. In actual implementation, these devices may appear under other names. As long as functions of the respective devices are similar to the present disclosure, they fall within the scope of the claims and their equivalents.

These and other aspects of the present disclosure will be more readily apparent from the following description of the embodiments.

DESCRIPTION OF EMBODIMENTS

Technical solutions of the embodiments of the present disclosure will be clearly and thoroughly described in the following with reference to the accompanying drawings of the embodiments.

It should be understood that the technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), an universal mobile telecommunication system (UMTS), a worldwide interoperability for microwave access (WiMAX) communication system, a new radio (NR) or future 5G System, etc.

In particular, the technical solutions of the embodiments of the present disclosure can be applied to various communication systems based on non-orthogonal multiple access technologies, such as a sparse code multiple access (SCMA) system, a low density signature (LDS) system, etc. Certainly, the SCMA system and the LDS system may also be referred to as other names in the communication field. Further, the technical solutions of the embodiments of the present disclosure can be applied to a multi-carrier transmission system using non-orthogonal multiple access technology, for example, an orthogonal frequency division multiplexing (OFDM) system, a filter bank multi-carrier (FBMC) system, a generalized frequency division multiplexing (GFDM) system, a filtered-OFDM (F-OFDM) system and the like, which use non-orthogonal multiple access technologies.

A terminal device in an embodiment of the present disclosure may refer to a user equipment (UE), an access terminal, a subscriber unit, a subscriber station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with wireless communication functions, a computing device or other processing device connected to a wireless modem, an in-vehicle device, a wearable device, a terminal device in a future 5G network, or a terminal device in a future evolutional public land mobile network (PLMN) and the like, which is not limited in the embodiment of the present disclosure.

A network device in an embodiment of the present disclosure may be a device for communicating with a terminal device, where the network device may be a base transceiver station (BTS) in GSM or CDMA, or may be a NodeB (NB) in a WCDMA system, or may be an evolutional NodeB (eNB or eNodeB) in a LTE system, or may be a wireless controller in a cloud radio access network (CRAN) scenario, or the network device may be a relay station, an access point, an in-vehicle device, a wearable device, and a network device in a future 5G network or a network device in a future evolutional PLMN network, which is not limited in the embodiment of the present disclosure.

Figure 1:
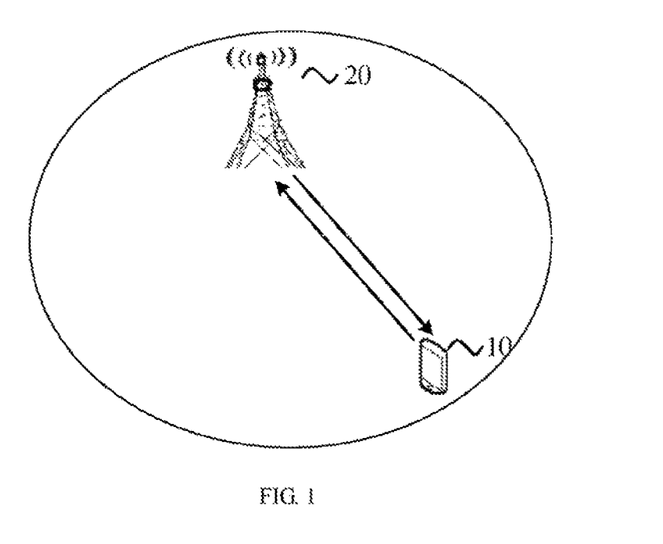
FIG. 1 shows a schematic diagram of an application scenario according to an embodiment of the present disclosure.

FIG. 1 is a schematic diagram of an application scenario according to an embodiment of the present disclosure. The communication system in FIG. 1 may include a terminal device 10 and a network device 20. The network device 20 is configured to provide a communication service for the terminal device 10 and access a core network. The terminal device 10 accesses a network by searching for a synchronization signal, a broadcast signal, and the like transmitted by the network device 20, and then performs communication with the network. Arrows shown in FIG. 1 may represent uplink/downlink transmissions on a cellular link between the terminal device 10 and the network device 20.

For two antenna ports, if a large-scale property of a radio channel transmitting a symbol through one of the antenna ports can be inferred from a radio channel transmitting a symbol through the other antenna port, the two antenna ports can be considered to be quasi co-located. The large-scale property, i.e., QCL information mentioned herein, includes at least one of the following parameters: Doppler shift, Doppler spread, average delay, delay spread and spatial receiving (Rx) parameter. That is, when the two antenna ports are QCL, it is indicated that a large-scale property of a radio channel of one antenna port corresponds to a large-scale property of a radio channel of the other antenna port. Considering multiple antenna ports that transmit reference signals (RSs), when antenna ports that transmit two different types of RSs are QCL, a large-scale property of a radio channel of one antenna port may be substituted by a large-scale property of a radio channel of the other antenna port.

Suppose A is a reference signal and B is a target signal. If A and B are quasi-co-located with respect to a large-scale parameter mentioned above, a UE can then estimate the large-scale parameter of quasi co-location from A, so that B can use the large-scale parameter for subsequent operations. For example, the UE can perform the following operations:

Regarding delay spread and Doppler spread, the UE can equivalently apply estimation results of power-delay profile, delay spread, Doppler spectrum and Doppler spread of a radio channel of one antenna port to a Wiener filter used for channel estimation of a radio channel of the other antenna port.

Regarding frequency shift and receiving timing, the UE can perform time and frequency synchronization on one antenna port and then apply the same synchronization to a demodulation of another antenna port.

Regarding average receiving power, the UE may measure reference signal receiving power (RSRP) of two or more antenna ports and take an average.

Regarding a spatial receiving parameter, the UE can apply beam information used for a signal transmitted by one antenna port to a signal transmitted by the other antenna port. For example, beams used by the UE to receive signals on two antenna ports may be the same.

In the current NR design, the network can configure some resources for CSI measurements, which mainly include CSI-RS resources for channel measurement and CSI-RS resources for interference measurement. In a CSI measurement, the UE makes a QCL assumption on a spatial parameter of a CSI-RS resource used for channel measurement and a spatial parameter of the CSI-RS resources used for interference measurement. That is, the CSI-RS resource for channel measurement and the CSI-RS resource for interference measurement have spatially QCL, or the CSI-RS resource for channel measurement and the CSI-RS for interference measurement have a QCL association with respect to a spatial receiving parameter. A network can also perform a configuration of the QCL assumption for a CSI-RS resource. By way of example, taking A as a reference signal and B as a target signal, in a configuration for B or a B-included set, a configuration of a corresponding QCL assumption can be carried. The specific configuration may be as follows:

A and parameter type X are included, and then it can be considered that A and B are quasi-co-located with respect to parameter X.

A1 and parameter type X1, and A2 and parameter type X2 are included, it can be considered that A1 and B are quasi-co-located with respect to parameter type X1, and A2 and B are quasi-co-located with respect to parameter type X2.

The parameter type X, the parameter type X1, and the parameter type X2 may be at least one of the above-mentioned large scale properties.

Figure 2:
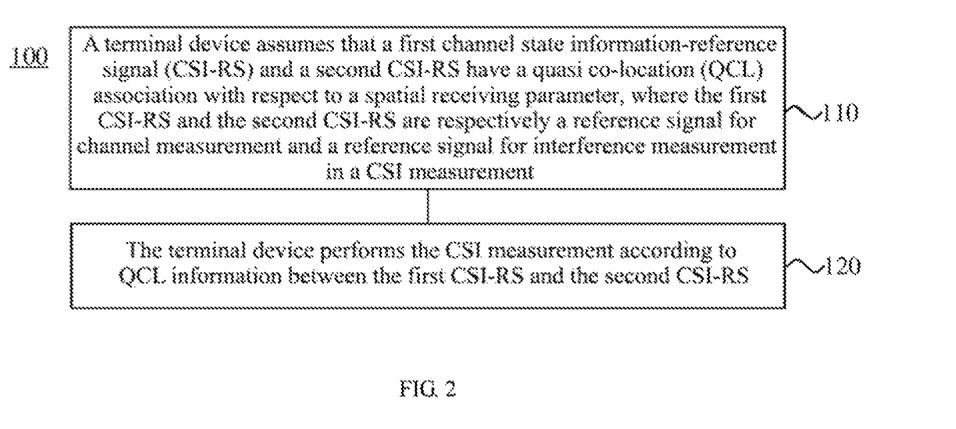
FIG. 2 shows a schematic block diagram of a method for CSI measurement according to an embodiment of the present disclosure.

FIG. 2 shows a schematic block diagram of a method 100 for CSI measurement according to an embodiment of the present disclosure. As shown in FIG. 2, the method 100 includes some or all the following:

S110, a terminal device assumes that a first channel state information-reference signal (CSI-RS) and a second CSI-RS have a quasi co-location (QCL) association with respect to a spatial receiving parameter, where the first CSI-RS and the second CSI-RS are respectively a reference signal for channel measurement and a reference signal for interference measurement in a CSI measurement.

S120, the terminal device performs the CSI measurement according to QCL information between the first CSI-RS and the second CSI-RS.

Specifically, in a CSI measurement, a UE first assumes that a CSI-RS for channel measurement and a CSI-RS for interference measurement have spatially QCL, or that the CSI-RS for channel measurement and the CSI-RS for interference measurement have a QCL association with respect to a spatial receiving parameter. That is, based on a spatial receiving parameter of any one of the two types of CSI-RSs, the UE can measure the other type of CSI-RS. For example, the UE may receive the CSI-RS for interference measurement using a receive beam of the CSI-RS for channel measurement, or the UE may also perform a beam measurement of the CSI-RS for interference measurement using the receive beam of the CSI-RS for channel measurement.

The QCL assumption may be divided into two types. A parameter corresponding to a first type of QCL assumption may be a spatial receiving parameter, while a parameter corresponding to a second type of QCL assumption may be at least one of Doppler shift, Doppler spread, average delay and delay spread.

That is to say, in the embodiment of the present disclosure, the UE performs at least the first type of QCL assumption.

Detailed description of the technical solution of the embodiment of the present disclosure is shown below, where, by way of example, the CSI-RS for channel measurement, i.e. the first CSI-RS herein, is taken as a reference signal, and the CSI-RS for interference measurement, i.e. the second CSI-RS herein, is taken as a target signal.

In an implementation, a network device may not configure the first type of QCL assumption for the second CSI-RS, and the UE may perform the CSI measurement according to the first type of QCL assumption performed by the UE itself. Specifically, the UE may perform the CSI measurement using a spatial receiving parameter between the first CSI-RS and the second CSI-RS, which have a QCL association as the UE assumes. That is, the UE may use a spatial receiving parameter of the first CSI-RS as a spatial receiving parameter of the second CSI-RS, that is, the spatial receiving parameter of the first CSI-RS can be used for an interference measurement.

In an implementation, the network device may not configure the second type of QCL assumption for the second CSI-RS, and the UE may perform a CSI measurement without using the second type of QCL assumption. The UE may also perform a second type of QCL assumption of the second CSI-RS. Furthermore, the UE can perform a CSI measurement according to the second type of QCL assumption assumed by the UE itself. The UE may also perform a CSI measurement without using the second type of QCL assumption. For example, the UE may perform a CSI interference measurement without using the second type of QCL assumption.

The UE may also not perform the first type of QCL assumption and/or the second type of QCL assumption of the second CSI-RS. The network device may configure a first type of QCL assumption and/or a second type of QCL assumption for the second CSI-RS.

In an implementation of the present disclosure, the method further includes: the terminal device receives first configuration information transmitted by the network device, where the first configuration information is used to indicate a second type of QCL assumption configured by the network device between the first CSI-RS and the second CSI-RS, and a parameter corresponding to the second type of QCL assumption includes at least one of the following parameters: Doppler shift, Doppler spread, average delay, and delay spread; and the terminal device performing the CSI measurement according to QCL information between the first CSI-RS and the second CSI-RS, includes: the terminal device performs the CSI measurement according to the parameter corresponding to the second type of QCL assumption that is indicated by the first configuration information, and the spatial receiving parameter between the first CSI-RS and the second CSI-RS that have a QCL association assumed by the terminal device.

For example, the UE performs the first type of QCL assumption for the second CSI-RS, and the network device only configures the second type of QCL assumption for the second CSI-RS, then the UE can perform a CSI measurement according to the first type of QCL assumption made by itself and the second type of QCL assumption configured by the network device. For another example, the UE may also perform the first type of QCL assumption for the second CSI-RS, and also perform the second type of QCL assumption for the second CSI-RS, and the network device also configures the second type of QCL assumption for the second CSI-RS, then the UE can perform a CSI measurement based on the first type of QCL assumption made by the UE itself and the second type of QCL assumption configured by the network device.

In an implementation of the present disclosure, the method further includes: the terminal device receives second configuration information transmitted by a network device, where the second configuration information is used to indicate a first type of QCL assumption configured by the network device for the second CSI-RS, and a parameter corresponding to the first type of QCL assumption is a spatial receiving parameter; and the terminal device performing the CSI measurement according to QCL information between the first CSI-RS and the second CSI-RS, includes: the terminal device performs the CSI measurement according to the parameter corresponding to the first type of QCL assumption that is indicated by the second configuration information if the first type of QCL assumption indicated by the second configuration information is a first type of QCL assumption between the first CSI-RS and the second CSI-RS.

In an implementation of the present disclosure, the method further includes: the terminal device determines that the second configuration information is configuration information that is not expected to receive, if the first type of QCL assumption indicated by the second configuration information is not the first type of QCL assumption between the first CSI-RS and the second CSI-RS. Furthermore, the terminal device performs the CSI measurement according to the spatial receiving parameter between the first CSI-RS and the second CSI-RS that have a QCL association assumed by the terminal device.

For another example, the UE may also perform the first type of QCL assumption for the second CSI-RS, and also perform the second type of QCL assumption for the second CSI-RS, and the network device also configures the first type of QCL assumption and the second type of QCL assumption for the second CSI-RS, then the UE first needs to determine whether the first type of QCL assumption performed by the UE itself and the first type of QCL assumption indicated by the network device belong to a QCL association between the same two CSI-RSs. If they belong to the QCL association between the same two CSI-RSs, the UE can directly perform the CSI measurement according to the first type of QCL assumption and the second type of QCL assumption configured by the network device. If the first type of QCL assumption performed by the UE and the second type of QCL assumption do not belong to a QCL association between the same two CSI-RSs, the UE considers that the configuration received from the network device is incorrect, and the UE may ignore the first type of QCL assumption configured by the network device for the second CSI-RS. The UE may also perform a CSI measurement directly using the first type of QCL assumption made by the UE and the second type of QCL assumption configured by the network device.

In an implementation of the present disclosure, the first CSI-RS is a non-zero power CSI-RS (NZP CSI-RS) for channel measurement, and the second CSI-RS is a non-zero power CSI-RS for interference measurement and/or CSI based interference measurement (CSI-IM).

Therefore, the method for CSI measurement according to the embodiment of the present disclosure is advantageous for improving receiving performance of the UE.

Figure 3:
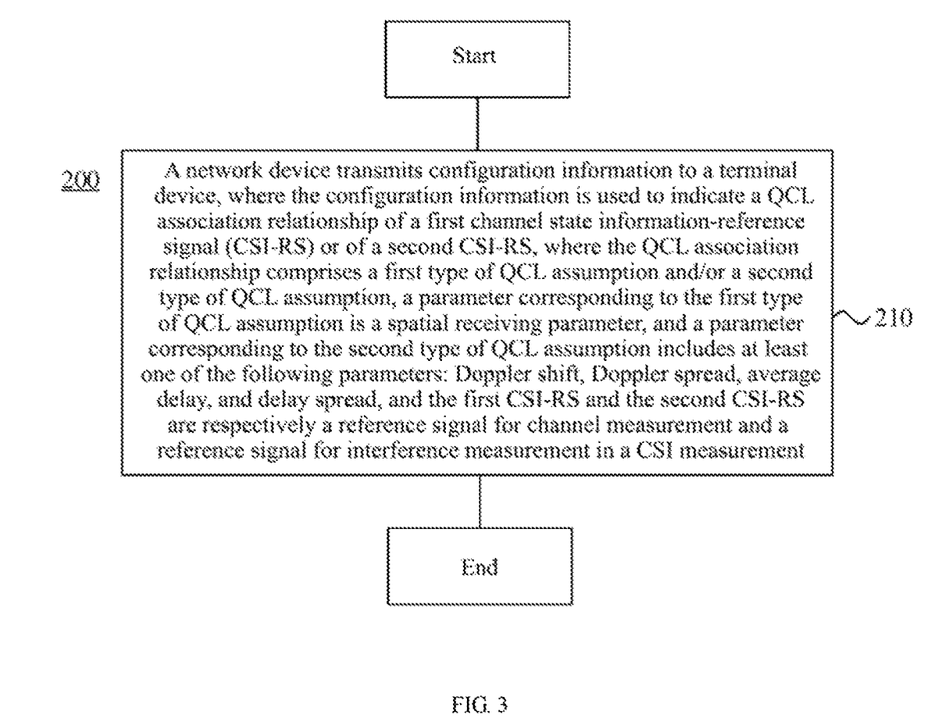
FIG. 3 shows another schematic block diagram of a method for CSI measurement according to an embodiment of the present disclosure.

FIG. 3 shows a schematic block diagram of a method 200 for CSI measurement according to an embodiment of the present disclosure. As shown in FIG. 3, the method 200 includes some or all the following:

S210, a network device transmits configuration information to a terminal device, where the configuration information is used to indicate a QCL association relationship of a first channel state information-reference signal (CSI-RS) or of a second CSI-RS, where the QCL association relationship includes a first type of QCL assumption and/or a second type of QCL assumption, a parameter corresponding to the first type of QCL assumption is a spatial receiving parameter, and a parameter corresponding to the second type of QCL assumption includes at least one of the following parameters: Doppler shift, Doppler spread, average delay, and delay spread, and the first CSI-RS and the second CSI-RS are respectively a reference signal for channel measurement and a reference signal for interference measurement in a CSI measurement.

Therefore, the method for CSI measurement according to the embodiment of the present disclosure is advantageous for improving receiving performance of the UE.

In an implementation of the present disclosure, the QCL association relationship is a QCL assumption between the first CSI-RS and the second CSI-RS.

In an implementation of the present disclosure, the first CSI-RS is a non-zero power CSI-RS for channel measurement, and the second CSI-RS is a non-zero power CSI-RS for interference measurement.

It should be understood that terms "system" and "network" are used interchangeably herein. Term "and/or" in this context is merely an association relationship describing associated objects, indicating that there may be three relationships, for example, A and/or B may indicate the following three situations: A exists separately, both A and B exist, B exits separately. In addition, character "/" herein generally indicates an "or" relationship between associated objects.

It should be understood that an interaction and related features, functions between a network device and a terminal device described from the network device side correspond to related features and functions of the terminal device. Related content has been described in detail in the above method 100. For the sake of brevity, no further details are provided herein.

It should also be understood that, in various embodiments of the present disclosure, the order of sequence numbers of the above processes does not mean the order of execution, and the order of execution of each process should be determined by its function and internal logic, which should not be construed as limiting to an implementation of an embodiment of the present disclosure.

The method for CSI measurement according to the embodiments of the present disclosure is described in detail above. Hereinafter, a device for CSI measurement according to the embodiments of the present disclosure will be described with reference to FIG. 4 to FIG. 7. The technical features described in the method embodiments are applicable to the following device embodiments.

Figure 4:
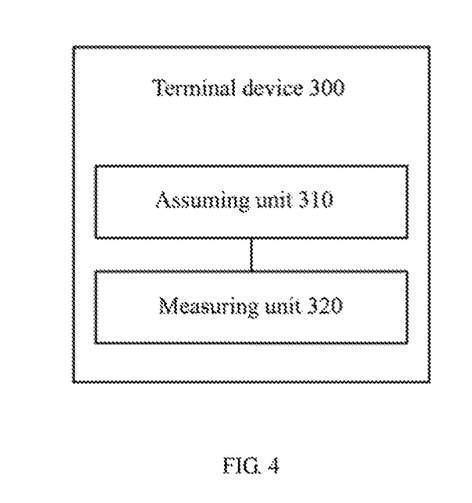
FIG. 4 shows a schematic block diagram of a terminal device according to an embodiment of the present disclosure.

FIG. 4 shows a schematic block diagram of a terminal device 300 according to an embodiment of the present disclosure. As shown in FIG. 4, the terminal device 300 includes:

an assuming unit 310, configured to assume that a first channel state information-reference signal (CSI-RS) and a second CSI-RS have a quasi co-location (QCL) association with respect to a spatial receiving parameter, where the first CSI-RS and the second CSI-RS are respectively a reference signal for channel measurement and a reference signal for interference measurement in a CSI measurement; and;

a measuring unit 320, configured to perform the CSI measurement according to QCL information between the first CSI-RS and the second CSI-RS.

Therefore, the terminal device according to the embodiment of the present disclosure is advantageous for improving receiving performance of a UE.

In an implementation of the present disclosure, a network device does not configure a first type of QCL assumption between the first CSI-RS and the second CSI-RS, and a parameter corresponding to the first type of QCL assumption is a spatial receiving parameter.

In an implementation of the present disclosure, the network device does not configure a second type of QCL assumption between the first CSI-RS and the second CSI-RS, a parameter corresponding to the second type of QCL assumption includes at least one of the following parameters: Doppler shift, Doppler spread, average delay, and delay spread.

In an implementation of the present disclosure, the terminal device further includes: a first receiving unit, configured to receive first configuration information transmitted by a network device, where the first configuration information is used to indicate a second type of QCL assumption configured by the network device between the first CSI-RS and the second CSI-RS, and a parameter corresponding to the second type of QCL assumption includes at least one of the following parameters: Doppler shift, Doppler spread, average delay, and delay spread; and the measuring unit is specifically configured to: perform the CSI measurement according to the parameter corresponding to the second type of QCL assumption that is indicated by the first configuration information, and the spatial receiving parameter between the first CSI-RS and the second CSI-RS that have a QCL association assumed by the terminal device.

In an implementation of the present disclosure, the terminal device further includes: a second receiving unit, configured to receive second configuration information transmitted by a network device, where the second configuration information is used to indicate a first type of QCL assumption configured by the network device for the second CSI-RS, and a parameter corresponding to the first type of QCL assumption is a spatial receiving parameter; and the measuring unit is specifically configured to: perform the CSI measurement according to the parameter corresponding to the first type of QCL assumption that is indicated by the second configuration information if the first type of QCL assumption indicated by the second configuration information is a first type of QCL assumption between the first CSI-RS and the second CSI-RS.

In an implementation of the present disclosure, the terminal device further includes: a determining unit, configured to determine that the second configuration information is configuration information that is not expected to receive, if the first type of QCL assumption indicated by the second configuration information is not the first type of QCL assumption between the first CSI-RS and the second CSI-RS.

In an implementation of the present disclosure, the measuring unit is specifically configured to: perform the CSI measurement according to the spatial receiving parameter between the first CSI-RS and the second CSI-RS that have a QCL association assumed by the terminal device.

In an implementation of the present disclosure, the second configuration information is further used to indicate a second type of QCL assumption configured between the first CSI-RS and the second CSI-RS, and a parameter corresponding to the second type of QCL assumption further includes at least one of the following parameters: Doppler shift, Doppler spread, average delay, and delay spread; and the measuring unit is specifically configured to: perform the CSI measurement according to the spatial receiving parameter between the first CSI-RS and the second CSI-RS that have a QCL association, and the parameter corresponding to the second type of QCL assumption that is indicated by the second configuration information.

In an implementation of the present disclosure, the first CSI-RS is a non-zero power CSI-RS for channel measurement, and the second CSI-RS is a non-zero power CSI-RS for interference measurement It should be understood that the terminal device 300 according to the embodiment of the present disclosure may correspond to the terminal device in the method embodiment of the present disclosure, and the foregoing and other operations and/or functions of the respective units in the terminal device 300 respectively implement corresponding processes of the terminal device in the method of FIG. 2. For the sake of brevity, details are not provided herein.

Figure 5:
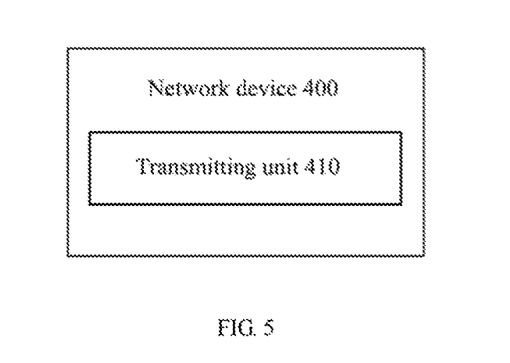
FIG. 5 shows a schematic block diagram of a network device according to an embodiment of the present disclosure.

FIG. 5 shows a schematic block diagram of a network device 400 of an embodiment of the present disclosure. As shown in FIG. 5, the network device 400 includes:

a transmitting unit 410, configured to transmit configuration information to a terminal device, where the configuration information is used to indicate a QCL association relationship of a first channel state information-reference signal (CSI-RS) or of a second CSI-RS, where the QCL association relationship includes a first type of QCL assumption and/or a second type of QCL, assumption, a parameter corresponding to the first type of QCL assumption is a spatial receiving parameter, and a parameter corresponding to the second type of QCL assumption includes at least one of the following parameters: Doppler shift, Doppler spread, average delay, and delay spread, and the first CSI-RS and the second CSI-RS are respectively a reference signal for channel measurement and a reference signal for interference measurement in a CSI measurement.

Therefore, the network device according to the embodiment of the present disclosure is advantageous for improving receiving performance of a UE.

In an implementation of the present disclosure, the QCL association relationship is a QCL assumption between the first CSI-RS and the second CSI-RS.

In an implementation of the present disclosure, the first CSI-RS is a non-zero power CSI-RS for channel measurement, and the second CSI-RS is for a non-zero power CSI-RS interference measurement.

It should be understood that the network device 400 according to the embodiment of the present disclosure may correspond to the network device in the method embodiment of the present disclosure, and the foregoing and other operations and/or functions of the respective units in the network device 400 respectively implement corresponding processes of the network device in the method of FIG. 3. For the sake of brevity, details are not provided herein.

Figure 6:
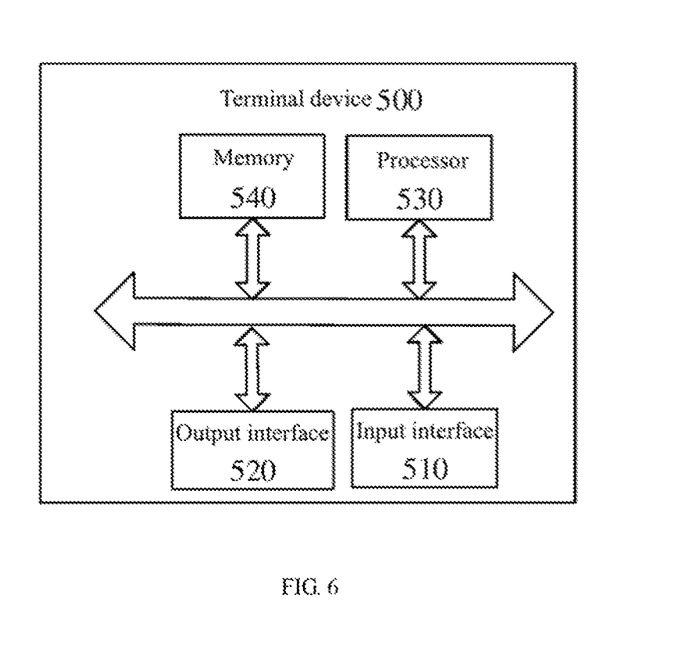
FIG. 6 shows another schematic block diagram of a terminal device according to an embodiment of the present disclosure.

As shown in FIG. 6, an embodiment of the present disclosure further provides a terminal device 500, which may be the terminal device 300 in FIG. 4, and which can be used to execute the corresponding content of the terminal device of the method 100 in FIG. 2. The terminal device 500 includes an input interface 510, an output interface 520, a processor 530, and a memory 540. The input interface 510, the output interface 520, the processor 530, and the memory 540 can be connected via a bus system. The memory 540 is configured to store a program, an instruction or code. The processor 530 is configured to execute the program, the instruction or the code stored in the memory 540 to control the input interface 510 to receive a signal, control the output interface 520 to transmit a signal, and implement the operations in the foregoing method embodiments.

Therefore, the terminal device according to the embodiment of the present disclosure is advantageous for improving receiving performance of the UE.

It should be understood that in the embodiment of the present disclosure, the processor 530 may be a central processing unit (CPU), the processor 530 may also be another general-purpose processor, a digital signal processor (DSP), an application specific integrated circuit (ASIC), a field programmable gate array (FPGA) or other programmable logic device, a discrete gate or a transistor logic device, a discrete hardware component, etc. The general-purpose processor may be a microprocessor, or the processor may be any conventional processor or the like.

The memory 540 may include a read only memory and a random access memory and provides instructions and data to the processor 530. A portion of the memory 540 may also include a non-volatile random access memory. For example, the memory 540 can also store information of a type of a device.

In an implementation process, each content of the foregoing method may be implemented by an integrated logic circuit of hardware in the processor 530 or an instruction in a form of software. The content of the method disclosed in the embodiments of the present disclosure may be directly implemented by a hardware processor, or may be performed by a combination of hardware and software modules in the processor. The software module may be located in a conventional storage medium such as a random access memory, a flash memory, a read only memory, a programmable read only memory or an electrically erasable programmable memory, a register, and the like. The storage medium is located in the memory 540, the processor 530 reads information in the memory 540 and combines the hardware to implement the contents of the above method. To avoid repetition, it will not be described in detail here.

In a specific implementation, the assuming unit, the measurement unit, and the determining unit of the terminal device 300 may be implemented by the processor 530 in FIG. 6, the first receiving unit and the second receiving unit of the terminal device 300 may be implemented by the input interface 510 and the output interface 520 in FIG. 6, respectively.

Figure 7:
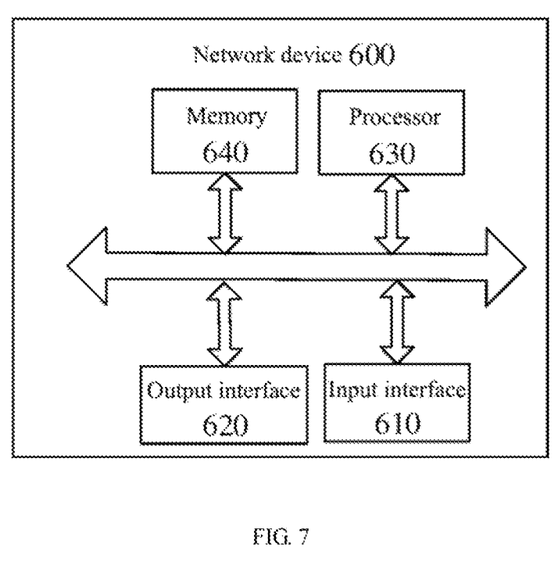
FIG. 7 shows another schematic block diagram of a network device according to an embodiment of the present disclosure.

As shown in FIG. 7, an embodiment of the present disclosure further provides a network device 600, which may be the network device 400 in FIG. 5, and which can be used to execute the corresponding content of the network device of the method 200 in FIG. 3. The network device 600 includes an input interface 610, an output interface 620, a processor 630, and a memory 640. The input interface 610, the output interface 620, the processor 630, and the memory 640 can be connected via a bus system. The memory 640 is configured to store a program, an instruction or code. The processor 630 is configured to execute the program, the instruction or the code stored in the memory 640 to control the input interface 510 to receive a signal, control the output interface 620 to transmit a signal, and implement the operations in the foregoing method embodiments.

Therefore, the network device according to the embodiment of the present disclosure is advantageous for improving receiving performance of the UE.

It should be understood that in the embodiment of the present disclosure, the processor 630 may be a central processing unit (CPU), the processor 630 may also be another general-purpose processor, a digital signal processor (DSP), an application specific integrated circuit (ASIC), a field programmable gate array (FPGA) or other programmable logic device, a discrete gate or a transistor logic device, a discrete hardware component, etc. The general-purpose processor may be a microprocessor, or the processor may be any conventional processor or the like.

The memory 640 may include a read only memory and a random access memory and provides instructions and data to the processor 630. A portion of the memory 640 may also include a non-volatile random access memory. For example, the memory 640 can also store information of a type of a device.

In an implementation process, each content of the foregoing method may be implemented by an integrated logic circuit of hardware in the processor 630 or an instruction in a form of software. The content of the method disclosed in the embodiments of the present disclosure may be directly implemented by a hardware processor, or may be performed by a combination of hardware and software modules in the processor. The software module may be located in a conventional storage medium such as a random access memory, a flash memory, a read only memory, a programmable read only memory or an electrically erasable programmable memory, a register, and the like. The storage medium is located in the memory 640, the processor 630 reads information in the memory 640 and combines the hardware to implement the contents of the above method. To avoid repetition, it will not be described in detail here.

In a specific implementation, the transmitting unit in the network device 400 can be implemented by the output interface 620 in FIG. 7.

Those of ordinary skill in the art will appreciate that elements and algorithm steps of the various examples described in connection with the embodiments disclosed herein can be implemented in electronic hardware or a combination of computer software and electronic hardware. Whether these functions are implemented in hardware or software depends on a specific application and design constraint of the technical scheme. Professionals can use different methods for each specific application to implement the described functionality, but such implementation should not be considered beyond the scope of the present disclosure.

A person skilled in the art can clearly understand that for the convenience and brevity of the description, specific working processes of a system, a device and a unit described above can refer to the corresponding processes in the foregoing method embodiments, and details are not described herein again.

In the several embodiments provided by the present disclosure, it should be understood that the disclosed system, device, and method may be implemented in other manners. For example, the device embodiments described above are merely illustrative. For example, the division of the unit is only a logical function division, and in an actual implementation, there may be another division manner, for example, multiple units or components may be combined or can be integrated into another system, or some features can be ignored or not executed. In addition, the mutual coupling or direct coupling or communication connection shown or discussed may be an indirect coupling or a communication connection through some interfaces, devices or units, and may be electrical, mechanical or otherwise.

The units described as separate components may or may not be physically separated, and the components displayed as units may or may not be physical units, that is, may be located in one site, or may be distributed to multiple network units. Some or all of the units may be selected according to actual needs to achieve the purpose of the solution of the embodiments.

Furthermore, each functional unit in the embodiments of the present disclosure may be integrated into one processing unit, or each unit may be separate physically, or two or more units may be integrated into one unit.

The functions may be stored in a computer readable storage medium if implemented in the form of a software functional unit and sold or used as a standalone product. Based on such understanding, the technical solution of the present disclosure, in nature, or a part which makes contributions to the prior art, or a part of the technical solution, may be embodied in the form of a software product, which is stored in a storage medium, where a plurality of instructions are included to cause a computer device (which may be a personal computer, a server, or a network device, etc.) to perform all or part of the steps of the method described in the embodiments of the present disclosure. The foregoing storage medium includes: a USB flash disk, a mobile hard disk, a read-only memory (ROM), a random access memory (RAM), a magnetic disk, or an optical disk, and the like which can store program codes.

The foregoing description is only specific embodiments of the present disclosure; however, the scope of protection of the present disclosure is not limited thereto, and changes or substitutions that can be readily think of by any person skilled in the art within the technical scope disclosed in the present disclosure shall be covered by the scope of protection of the present disclosure. Therefore, the scope of protection of the present disclosure shall be subject to the scope of protection of the claims.

What is claimed is:

1. A method for channel state information (CSI) measurement, comprising:
assuming, by a terminal device, that a first channel state information-reference signal (CSI-RS) and a second CSI-RS have a quasi co-location (QCL) association with respect to a spatial receiving parameter, wherein the first CSI-RS and the second CSI-RS are respectively a reference signal for channel measurement and a reference signal for interference measurement in a CSI measurement; and performing, by the terminal device, the CSI measurement according to QCL information between the first CSI-RS and the second CSI-RS;

wherein the method further comprises:

receiving, by the terminal device, second configuration information transmitted by a network device, wherein the second configuration information indicates a first type of QCL assumption configured by the network device for the second CSI-RS, and a parameter corresponding to the first type of QCL assumption is a spatial receiving parameter; and the performing, by the terminal device, the CSI measurement according to QCL information between the first CSI-RS and the second CSI-RS, comprises:

determining, by the terminal device, whether the first type of QCL assumption indicated by the second configuration information is a first type of QCL assumption between the first CSI-RS and the second CSI-RS;

performing, by the terminal device, the CSI measurement according to the parameter corresponding to the first type of QCL assumption that is indicated by the second configuration information, if it is determined that the first type of QCL assumption indicated by the second configuration information is the first type of QCL assumption between the first CSI-RS and the second CSI-RS;

determining, by the terminal device, that the second configuration information is configuration information that is not expected to receive, if it is determined that the first type of QCL assumption indicated by the second configuration information is not the first type of QCL assumption between the first CSI-RS and the second CSI-RS; and performing, by the terminal device, the CSI measurement according to the spatial receiving parameter between the first CSI-RS and the second CSI-RS that have a QCL association assumed by the terminal device.

2. The method according to claim 1, wherein the network device does not configure a second type of QCL assumption between the first CSI-RS and the second CSI-RS, and a parameter corresponding to the second type of QCL assumption comprises at least one of the following parameters: Doppler shift, Doppler spread, average delay, and delay spread.

3. The method according to claim 1, wherein the method further comprises:

receiving, by the terminal device, first configuration information transmitted by the network device, wherein the first configuration information is used to indicate a second type of QCL assumption configured by the network device between the first CSI-RS and the second CSI-RS, and a parameter corresponding to the second type of QCL assumption comprises at least one of the following parameters: Doppler shift, Doppler spread, average delay, and delay spread; and the performing, by the terminal device, the CSI measurement according to QCL information between the first CSI-RS and the second CSI-RS, comprises:

performing, by the terminal device, the CSI measurement according to the parameter corresponding to the second type of QCL assumption that is indicated by the first configuration information, and the spatial receiving parameter between the first CSI-RS and the second CSI-RS that have a QCL association assumed by the terminal device.

4. The method according to claim 1, wherein the second configuration information is further used to indicate a second type of QCL assumption configured between the first CSI-RS and the second CSI-RS, and a parameter corresponding to the second type of QCL assumption further comprises at least one of the following parameters: Doppler shift, Doppler spread, average delay, and delay spread; and the performing, by the terminal device, the CSI measurement according to QCL information between the first CSI-RS and the second CSI-RS, comprises:

performing, by the terminal device, the CSI measurement according to the spatial receiving parameter between the first CSI-RS and the second CSI-RS that have the QCL association, and the parameter corresponding to the second type of QCL assumption that is indicated by the second configuration information.

5. The method according to claim 1, wherein the first CSI-RS is a non-zero power CSI-RS for channel measurement, and the second CSI-RS is a non-zero power CSI-RS for interference measurement.

6. A terminal device, wherein the terminal device comprises a processor and a non-transitory memory and an input interface, wherein the memory is configured to store a program, an instruction or code, the processor is configured to execute the program, the instruction or the code stored in the memory to implement the following steps:

assuming that a first channel state information-reference signal (CSI-RS) and a second CSI-RS have a quasi co-location (QCL) association with respect to a spatial receiving parameter, wherein the first CSI-RS and the second CSI-RS are respectively a reference signal for channel measurement and a reference signal for interference measurement in a CSI measurement; and performing the CSI measurement according to QCL information between the first CSI-RS and the second CSI-RS;

wherein the processor is further configured to control the input interface to:

receive second configuration information transmitted by a network device, wherein the second configuration information indicates a first type of QCL assumption configured by the network device for the second CSI-RS, and a parameter corresponding to the first type of QCL assumption is a spatial receiving parameter; and the processor is configured to:

determine whether the first type of QCL assumption indicated by the second configuration information is a first type of QCL assumption between the first CSI-RS and the second CSI-RS;

perform the CSI measurement according to the parameter corresponding to the first type of QCL assumption that is indicated by the second configuration information if it is determined that the first type of QCL assumption indicated by the second configuration information is the first type of QCL assumption between the first CSI-RS and the second CSI-RS;

determine that the second configuration information is configuration information that is not expected to receive, if it is determined that the first type of QCL assumption indicated by the second configuration information is not the first type of QCL assumption between the first CSI-RS and the second CSI-RS; and perform the CSI measurement according to the spatial receiving parameter between the first CSI-RS and the second CSI-RS that have a QCL association assumed by the terminal device.

7. The terminal device according to claim 6, wherein the network device does not configure a second type of QCL assumption between the first CSI-RS and the second CSI-RS, and a parameter corresponding to the second type of QCL assumption comprises at least one of the following parameters: Doppler shift, Doppler spread, average delay, and delay spread.

8. The terminal device according to claim 6, wherein the processor is further configured to control the input interface to:
receive first configuration information transmitted by the network device, wherein the first configuration information is used to indicate a second type of QCL assumption configured by a network device between the first CSI-RS and the second CSI-RS, and a parameter corresponding to the second type of QCL assumption comprises at least one of the following parameters: Doppler shift, Doppler spread, average delay, and delay spread; and
the processor is further configured to:
perform the CSI measurement according to the parameter corresponding to the second type of QCL assumption that is indicated by the first configuration information, and the spatial receiving parameter between the first CSI-RS and the second CSI-RS that have a QCL association assumed by the terminal device.

9. The terminal device according to claim 6, wherein the second configuration information is further used to indicate a second type of QCL assumption configured between the first CSI-RS and the second CSI-RS, a parameter corresponding to the second type of QCL assumption further comprises at least one of the following parameters: Doppler shift, Doppler spread, average delay, and delay spread; and
the processor is further configured to:
perform the CSI measurement according to the spatial receiving parameter between the first CSI-RS and the second CSI-RS that have the QCL association, and the parameter corresponding to the second type of QCL assumption that is indicated by the second configuration information.

10. The terminal device according to claim 6, wherein the first CSI-RS is a non-zero power CSI-RS for channel measurement, and the second CSI-RS is a non-zero power CSI-RS for interference measurement.

* * * * *